May 2, 1944.  H. R. JOHNSON  2,347,689
MODEL AIRPLANE
Filed Feb. 16, 1940
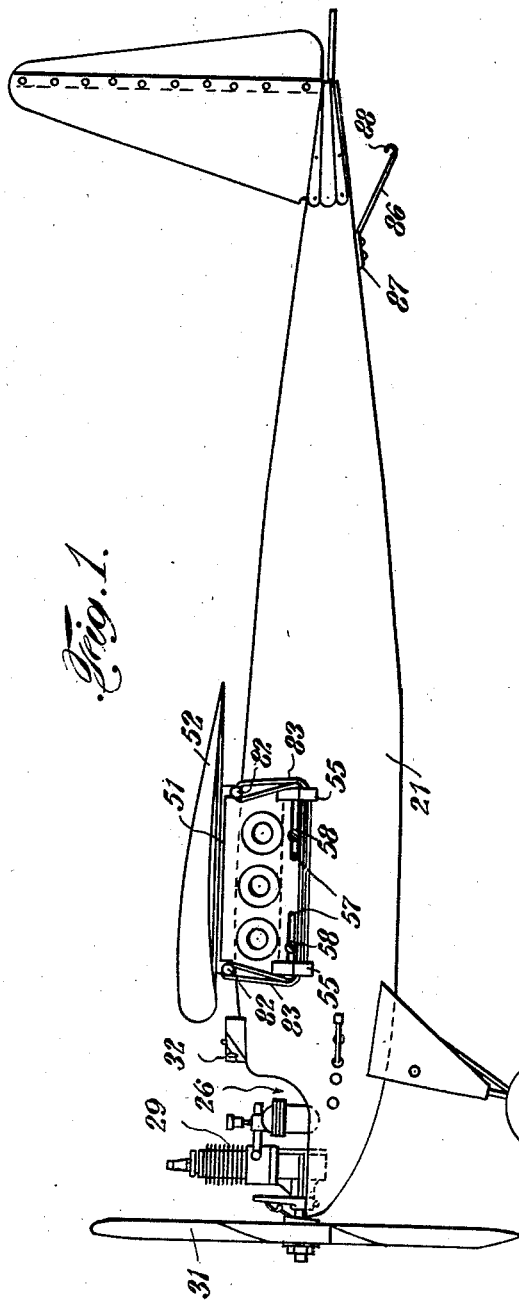
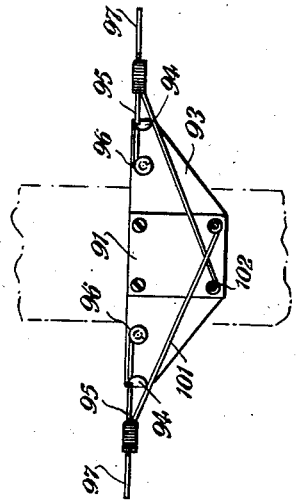
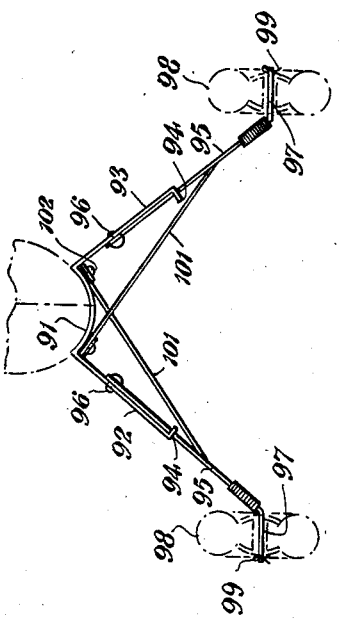
INVENTOR
Harold R. Johnson
BY
M. Theodore Simmons
ATTORNEY Patented May 2, 1944

2,347,689

UNITED STATES PATENT OFFICE 2,347,689

MODEL AIRPLANE

Harold R. Johnson, Bayside, N. Y.

Application February 16, 1940, Serial No. 319,246

5 Claims. (Cl. 46—76)

My invention relates to model airplanes, particularly to the type marketed as a kit of parts for assembly by the purchaser, and especially to the landing gear therefor.

Airplane models of this character as heretofore marketed have had a great many disadvantages, among which may be noted that the landing gear has been either rigid or flimsy so that the model or parts thereof were subject to damage involving repair or replacement of parts.

Among the objects of my invention are to provide an airplane model with a novel construction of landing gear which is easily assembled and attached to the aircraft, is sturdy and yet resilient in construction, and is economically manufactured.

It is another object of my invention to provide an airplane model that will withstand extraordinary shocks, strains, and stresses due to accidents in forced landings or otherwise.

It is another object of my invention to provide an all metal airplane model in which damages due to accidents in landing are confined to a minimum and are easily repairable.

Other and further objects of my invention will be apparent from this specification taken in conjunction with the accompanying drawing, in which—

Figure 1 is a side elevation of a completely assembled airplane model embodying my invention, Figs. 2 and 3 are respectively front and bottom views of the under-carriage of my airplane model.

In the illustrated design of airplane, all of the parts are preferably constructed of aluminum, aluminum alloys, or other light weight metal, insofar as practicable. Except for the undercarriage, claimed in this application, the elements of the airplane are shown only in sufficient detail for an understanding of the construction and use of my improved construction of undercarriage.

The fuselage 21, suitably tapered to accord with streamlining practices, is cut away at its forward end, as indicated at 26, and arranged for the support of a motor 29. Any suitable power plant may be used to drive the forward thrust propeller 31 mounted thereon, so that no description is made of the details of the illustrated motor or its mounting. The motor is desirably of the internal combustion engine type and makes use of an automatic timer 32 for controlling the duration of the flight, but other flight controls may be used, such as radio operated controls. Likewise, the mounting of the dry cell batteries on the interior of the fuselage is not shown, this being a matter left to the discretion and convenience of the assembler.

A mounting truss 51 for the wing 52 comprises an inverted U-shaped member which spans the fuselage the legs thereof being suitably fastened on opposite sides thereof as by screws 58 engaging in slots 57 in the truss. A pair of hooks 55, opening downwardly, are carried by the truss, and a pair of hooks 82 are carried on the under surface of the wing, the construction being alike on both sides of the fuselage. An elastic band 83 loops over the hooks 82 and under the hooks 55 to hold the wing in place.

A tail skid 86 shown in Fig. 1 consists of a strip of flat stock or resilient wire bent to have a mounting portion 87, which is secured to the bottom of the fuselage forwardly of the tail surfaces, and a rounded outer end 88.

The under-carriage consists of a metal plate having a wide central portion 91 bowed or shaped to conform to the bottom of the fuselage (as seen in Fig. 2) with two angularly projecting tapered leg portions 92 and 93, the ends of which are bent over to form tabs 94. The center portion 91 of the under-carriage plate is secured to the fuselage slightly rearwardly of the nose thereof, and when mounted in position as seen in Fig. 2, is substantially M-shaped with the legs diverging from the mounting portion.

A spring wire strut 95 is riveted or otherwise secured to each of the legs 92 and 93, as indicated at 96, and extends downwardly through a hole in each of the tabs 94, in extension of the legs 92 and 93. The lower end of each wire 95 is bent outwardly to form the axles 97 on which wheels 98 of any desired construction are mounted and held in place by cotter pins 99.

For most purposes the described construction is a sufficiently strong landing gear but in some cases it may be desirable to additionally brace the same by securing to each of the wires 95 a cross brace 101 which are fastened to the center portion 91 of the under-carriage plate as indicated at 102, these screws or rivets extending also into the fuselage shell, if desired. As shown in the drawing, the lower ends of the cross bracings 101 are detachably secured to the struts 95, by wrapping or similar arrangement.

The under-carriage is, of course, of sufficient height that the propeller 31 will not strike the ground under the circumstances of a regular landing and most of the landings usually made by these model airplanes designed for free flight. The independent mounting for each wheel on resilient members means that shocks from a regular or an irregular landing will be absorbed without damage even when the airplane "pancakes" from considerable height, or one wheel strikes an obstruction, and so on. If an accident occurs in which some parts of the landing gear are bent out of shape, such as the M-shaped plate, it is merely necessary to bend the same by hand into the original shape. The whole construction is such that damage to the airplane itself is held to a minimum in landing accidents, so that in a few minutes of re-adjustment by hand the model is ready to fly again.

Modifications may be made in the construction, arrangement and location of parts within the spirit and scope of my invention, and such modifications are intended to be covered by the appended claims.

I claim:

1. In a model airplane having a fuselage, a lifting wing and rear control surfaces mounted thereon, an under-carriage comprising an M-shaped metal plate secured beneath the fuselage, the center portion presenting a substantial area in contact with said fuselage, a spring wire secured to each depending leg of said plate and extending below the same each wire being bent outwardly at its free end to form an axle, and a wheel mounted on each axle.

2. In a model airplane having a fuselage, a lifting wing and rear control surfaces mounted thereon, an under-carriage comprising a metal plate secured beneath the fuselage, resilient wire legs secured thereto and extending below the same, each wire being bent outwardly at its free end to form an axle, a bracing strut secured to each wire leg and extending upwardly toward the longitudinal center line of the fuselage and also being secured to the fuselage, and a wheel mounted on each axle.

3. An undercarriage for model airplanes comprising a resilient plate curved at its center to receive the under portion of the fuselage of the airplane, divergent legs depending from said plate, an axle carried by each of said legs, a resilient connection between each axle and leg, and a wheel mounted on each axle.

4. An undercarriage for model airplanes comprising a resilient plate shaped at its center to form a cradle for and extending over a substantial area of the fuselage of the airplane, the end portions of the plate extending outwardly beyond the sides of the fuselage and being bent downwardly to form legs, an axle carried by each of said legs, a cross brace extending from each of said axles to said cradle, and a wheel mounted on each axle.

5. An undercarriage for model airplanes comprising a resilient plate having a center portion for attachment to the fuselage of the airplane and depending divergent legs, the free ends of the legs being bent to form tabs, a wire secured to each of the legs extending through said tabs respectively to form an extension on each leg, the free ends of the wires being bent outwardly to form axles, and a wheel mounted on each of said axles.

HAROLD R. JOHNSON.